(12) United States Patent
Sani

(10) Patent No.: US 8,080,074 B2
(45) Date of Patent: Dec. 20, 2011

(54) POLYCRYSTALLINE DIAMOND COMPACTS, AND RELATED METHODS AND APPLICATIONS

(75) Inventor: Mohammad N. Sani, Orem, UT (US)

(73) Assignee: US Synthetic Corporation, Orem, UT (US)

( * ) Notice: Subject to any disclaimer, the term of this patent is extended or adjusted under 35 U.S.C. 154(b) by 364 days.

(21) Appl. No.: 12/271,081

(22) Filed: Nov. 14, 2008

(65) Prior Publication Data

US 2009/0152018 A1 Jun. 18, 2009

Related U.S. Application Data

(63) Continuation-in-part of application No. 11/983,619, filed on Nov. 9, 2007, now Pat. No. 8,034,136.

(60) Provisional application No. 60/860,098, filed on Nov. 20, 2006, provisional application No. 60/876,701, filed on Dec. 21, 2006.

(51) Int. Cl.
*B24D 3/00* (2006.01)
*B24D 11/00* (2006.01)
*B24D 18/00* (2006.01)
*B24D 3/02* (2006.01)
*C09K 3/14* (2006.01)
*C09C 1/68* (2006.01)

(52) U.S. Cl. .............. 51/307; 51/293; 51/309

(58) Field of Classification Search .......... 51/307, 51/293, 309
See application file for complete search history.

(56) References Cited

U.S. PATENT DOCUMENTS

| | | | |
|---|---|---|---|
| 4,268,276 A | 5/1981 | Bovenkerk | |
| 4,274,900 A | 6/1981 | Mueller et al. | |
| 4,410,054 A | 10/1983 | Nagel et al. | |
| 4,460,382 A * | 7/1984 | Ohno | 51/307 |
| 4,468,138 A | 8/1984 | Nagel | |
| 4,560,014 A | 12/1985 | Geczy | |
| 4,738,322 A | 4/1988 | Hall et al. | |
| 4,811,801 A | 3/1989 | Salesky et al. | |
| 4,913,247 A | 4/1990 | Jones | |
| 4,985,051 A * | 1/1991 | Ringwood | 51/309 |

(Continued)

FOREIGN PATENT DOCUMENTS

EP 0 297 071 12/1988
(Continued)

OTHER PUBLICATIONS

Declaration of Prior Sales of Terracut PDCS executed by Kenneth E. Bertagnolli Feb. 3, 2011.
(Continued)

*Primary Examiner* — James McDonough
(74) *Attorney, Agent, or Firm* — Workman Nydegger

(57) ABSTRACT

Embodiments of the invention relate to polycrystalline diamond compacts ("PDCs") and methods of fabricating such PDCs. In an embodiment of a "two-step" manufactured PDC, a PDC includes a substrate and a pre-sintered polycrystalline diamond ("PCD") table bonded to the substrate. The pre-sintered PCD table includes bonded diamond grains defining interstitial regions. At least a portion of the interstitial regions include at least one material disposed therein selected from a silicon-cobalt alloy, silicon carbide, cobalt carbide, or a mixed carbide of silicon and cobalt. The pre-sintered PCD table lacks an intermediate contaminant region therein that includes at least one type of fabrication by-product generated during the fabrication of the pre-sintered PCD table.

15 Claims, 15 Drawing Sheets

U.S. PATENT DOCUMENTS

| | | | |
|---|---|---|---|
| 5,016,718 A | 5/1991 | Tandberg | |
| 5,032,147 A | 7/1991 | Frushour | |
| 5,092,687 A | 3/1992 | Hall | |
| 5,120,237 A | 6/1992 | Fussell | |
| 5,120,327 A * | 6/1992 | Dennis | 51/293 |
| 5,127,923 A | 7/1992 | Bunting et al. | |
| 5,135,061 A | 8/1992 | Newton, Jr. | |
| 5,151,107 A | 9/1992 | Cho et al. | |
| 5,154,245 A | 10/1992 | Waldenstrom et al. | |
| 5,173,091 A * | 12/1992 | Marek | 451/527 |
| 5,364,192 A | 11/1994 | Damm et al. | |
| 5,368,398 A | 11/1994 | Damm et al. | |
| 5,460,233 A | 10/1995 | Meany et al. | |
| 5,480,233 A | 1/1996 | Cunningham | |
| 5,544,713 A | 8/1996 | Dennis | |
| 5,645,617 A | 7/1997 | Frushour | |
| 5,976,707 A * | 11/1999 | Grab | 428/547 |
| 6,165,616 A | 12/2000 | Lemelson et al. | |
| 6,344,149 B1 | 2/2002 | Oles | |
| 6,793,681 B1 | 9/2004 | Pope et al. | |
| 6,892,836 B1 | 5/2005 | Eyre et al. | |
| 7,377,341 B2 | 5/2008 | Middlemiss et al. | |
| 7,516,804 B2 | 4/2009 | Vail | |
| 7,552,782 B1 | 6/2009 | Sexton et al. | |
| 7,559,695 B2 | 7/2009 | Sexton et al. | |
| 2005/0050801 A1 | 3/2005 | Cho et al. | |
| 2005/0230156 A1 | 10/2005 | Belnap et al. | |
| 2005/0263328 A1 | 12/2005 | Middlemiss | |
| 2006/0191723 A1* | 8/2006 | Keshavan | 175/374 |
| 2007/0079994 A1 | 4/2007 | Middlemiss | |
| 2007/0187153 A1 | 8/2007 | Bertagnolli | |
| 2007/0284152 A1 | 12/2007 | Eyre et al. | |
| 2008/0010905 A1 | 1/2008 | Eyre | |
| 2008/0023231 A1 | 1/2008 | Vail | |
| 2008/0085407 A1 | 4/2008 | Cooley et al. | |
| 2008/0115421 A1 | 5/2008 | Sani | |
| 2008/0223623 A1 | 9/2008 | Keshavan et al. | |
| 2008/0230280 A1 | 9/2008 | Keshavan et al. | |

FOREIGN PATENT DOCUMENTS

| | | |
|---|---|---|
| EP | 0352811 A1 | 1/1990 |
| EP | 0 374 424 | 6/1990 |
| WO | 2008063568 | 5/2008 |

OTHER PUBLICATIONS

Declaration of Prior Sales of Terracut PDCS executed by Paul D. Jones Feb. 3, 2011.
U.S. Appl. No. 12/961,787, filed Dec. 7, 2010, Mukhopadhyay, et al.
U.S. Appl. No. 12/363,104, filed Oct. 14, 2010, Office Action.
U.S. Appl. No. 11/983,619, filed Aug. 9, 2010, Office Action.
Utility U.S. Appl. No. 12/363,104, filed Jan. 30, 2009, titled "Polycrystalline Diamond Compact Including Pre-Sintered Polycrystalline Diamond Table Having a Thermally-Stable Region and Applications Therefor".
Utility U.S. Appl. No. 12/120,849, filed May 15, 2008, titled "Polycrystalline Diamond Compacts, Methods of Fabricating Same, and Applications Using Same".
U.S. Appl. No. 60/860,098, filed Nov. 20, 2006, Sani.
U.S. Appl. No. 60/876,701, filed Dec. 21, 2006, Sani.
U.S. Appl. No. 11/983,619, filed May 26, 2010, Office Action.
Transmittal of PCT International Search Report for PCT International Application No. PCT/US2007/024090; Apr. 15, 2008.
PCT International Search Report for PCT International Application No. PCT/US20071024090; Apr. 15, 2008.
PCT Written Opinion of the International Searching Authority for PCT International Application No. PCT/US2007/024090; Apr. 15, 2008.
E.A. Ekimov, S. Gierlotka, E.L. Gromnitskaya, J.A. Kozubowski, B. Palosz, W. Lojkowski, and A.M. Naletov, Mechanical Properties and Microstructure of Diamond-SIC Nanocomposites, Inorganic Materials, vol. 38, No. 11, 2002, pp. 1324-1329.
Provisional U.S. Appl. No. 60/850,969, filed Oct. 10, 2006, titled "Superabrasive elements, method of manufacturing, and drill bits including same".
U.S. Appl. No. 11/545,929, filed Oct. 10, 2006, titled "Superabrasive elements, methods of manufacturing, and drill bits including same".
U.S. Appl. No. 13/230,125, filed Sep. 12, 2011, Sani.
U.S. Appl. No. 12/363,104, filed Aug. 25, 2011, Notice of Allowance.
U.S. Appl. No. 13/032,350, filed Feb. 22, 2011, Sani.
U.S. Appl. No. 11/983,619, filed Mar. 28, 2011, Office Action.
U.S. Appl. No. 11/983,619, filed Jun. 16, 2011, Notice of Allowance.
U.S. Appl. No. 12/363,104, filed Apr. 12, 2011, Office Action.
U.S. Appl. No. 13/285,198, filed Oct. 31, 2011, Sani.
U.S. Appl. No. 11/983,619, mailed Sep. 21, 2011, Issue Notification.

* cited by examiner

POLYCRYSTALLINE DIAMOND COMPACTS, AND RELATED METHODS AND APPLICATIONS

CLAIM OF PRIORITY

This application is a continuation-in-part of U.S. patent application Ser. No. 11/983,619 filed on 9 Nov. 2007, which claims the benefit of U.S. Provisional Application No. 60/860,098 filed on 20 Nov. 2006 and U.S. Provisional Application No. 60/876,701 filed on 21 Dec. 2006, the disclosures of each of the preceding applications are incorporated herein, in their entirety, by this reference.

BACKGROUND

Wear-resistant, superabrasive compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller cone drill bits and fixed cutter drill bits. A PDC cutting element typically includes a superabrasive diamond layer (also known as a diamond table). The diamond table is formed and bonded to a substrate using a high-pressure/high-temperature ("HPHT") process. The PDC cutting element may also be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented-carbide substrate into a container or cartridge with a volume of diamond particles positioned adjacent to the cemented-carbide substrate. A number of such cartridges may be loaded into a HPHT press. The substrates and volume of diamond particles are then processed under HPHT conditions in the presence of a catalyst material that causes the diamond particles to bond to one another to form a matrix of bonded diamond grains defining a polycrystalline diamond ("PCD") table that is bonded to the substrate. The catalyst material is often a metal-solvent catalyst (e.g., cobalt, nickel, iron, or alloys thereof) that is used for promoting intergrowth of the diamond particles.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of bonded diamond grains. Often, a solvent catalyst may be mixed with the diamond particles prior to subjecting the diamond particles and substrate to the HPHT process.

The presence of the solvent catalyst in the PCD table is believed to reduce the thermal stability of the PCD table at elevated temperatures. For example, the difference in thermal expansion coefficient between the diamond grains and the solvent catalyst is believed to lead to chipping or cracking of the PCD table during drilling or cutting operations, which can degrade the mechanical properties of the PCD table or cause failure. Additionally, some of the diamond grains can undergo a chemical breakdown or back-conversion to graphite via interaction with the solvent catalyst. At elevated high temperatures, portions of diamond grains may transform to carbon monoxide, carbon dioxide, graphite, or combinations thereof, thereby degrading the mechanical properties of the PCD table.

One conventional approach for improving the thermal stability of a PCD table of a PDC is to at least partially remove the solvent catalyst from the PCD table by acid leaching. Another conventional approach for forming a PDC includes separately forming a sintered PCD table that is subsequently leached to remove solvent catalyst from interstitial regions between bonded diamond grains. The leached PCD table may be bonded to a substrate and infiltrated with a non-catalyst material, such as silicon, in a separate HPHT process. The silicon may infiltrate the interstitial regions of the leached PCD table from which the solvent catalyst has been leached and react with the diamond grains to form silicon carbide.

Despite the availability of a number of different PDCs, manufacturers and users of PDCs continue to seek PDCs that exhibit improved toughness, wear resistance, thermal stability, and/or ease of processing.

SUMMARY

Embodiments of the invention relate to PDCs and methods of fabricating such PDCs. In an embodiment, a PDC includes a substrate and a pre-sintered PCD table bonded to the substrate. Such a PDC may be described as a "two-step" compact. The pre-sintered PCD table includes bonded diamond grains defining interstitial regions. At least a portion of the interstitial regions include at least one material disposed therein selected from the group of a silicon-cobalt alloy, silicon carbide, cobalt carbide, and a mixed carbide of silicon and cobalt. The pre-sintered PCD table lacks an intermediate contaminant region therein that includes at least one type of fabrication by-product generated during the fabrication of the pre-sintered PCD table and/or bonding the pre-sintered PCD table to the substrate.

In an embodiment, a method of fabricating a PDC includes positioning a silicon-cobalt containing layer between a substrate and an at least partially leached PCD table having interstitial regions therein to form an assembly. The method further includes subjecting the assembly to an HPHT process to infiltrate the interstitial regions with a liquid comprising silicon and cobalt from the silicon-cobalt containing layer.

In an embodiment, a method of fabricating a PDC includes positioning an at least partially leached PCD table having interstitial regions therein between a substrate and a silicon-cobalt containing layer to form an assembly. The method further includes subjecting the assembly to an HPHT process to infiltrate the interstitial regions with a liquid comprising silicon and cobalt from the silicon-cobalt containing layer.

In an embodiment, a PDC includes a substrate and a pre-sintered PCD table. The pre-sintered PCD table includes an interfacial surface bonded to the substrate and an opposing working surface. The pre-sintered PCD table includes a proximal region extending from the interfacial surface to an intermediate location within the pre-sintered PCD table that includes a metal-solvent catalyst infiltrant infiltrated from the substrate and a distal region extending from the working surface to the intermediate location that is substantially free of the metal-solvent catalyst infiltrant. Portions of the metal-solvent catalyst infiltrant exposed through the distal region have a surface structure characteristic of not being chemically etched.

In an embodiment, a method of fabricating a PDC includes positioning an at least partially leached PCD table adjacent to a substrate to form an assembly. The method further includes subjecting the assembly to an HPHT process to infiltrate the at least partially leached PCD table with an infiltrant from the substrate to no further than an intermediate location within the at least partially leached PCD table.

In an embodiment, a PDC includes a substrate and a pre-sintered PCD table including an interfacial surface bonded to the substrate and an opposing working surface. The pre-sintered PCD table includes bonded diamond grains defining interstitial regions. The pre-sintered PCD table includes a working region that extends inwardly from the working surface. At least a portion of the interstitial regions of the working region include silicon carbide and tungsten.

In an embodiment, a method of fabricating a PDC includes forming an at least partially leached PCD table including a first surface and an opposing second surface. The at least partially leached PCD table includes bonded diamond grains defining interstitial regions. The at least partially leached PCD table includes a first working region extending from the first surface to an intermediate location therein having tungsten, tungsten carbide, or combinations thereof disposed in at least some of the interstitial regions thereof and a second region extending inwardly from the second surface that is substantially free of tungsten. The method also includes positioning the second region at least proximate to a substrate to form an assembly. The method further includes subjecting the assembly to an HPHT process to form the PDC.

In an embodiment, a method of fabricating a PDC includes disposing a mass of diamond particles between a substrate and a metal-solvent catalyst layer to form an assembly. The metal-solvent catalyst layer is substantially free of tungsten and/or tungsten carbide. The method also includes infiltrating the mass of diamond particles partially with metal-solvent catalyst from the metal-solvent catalyst layer and partially with a metal-solvent catalyst constituent from the substrate under high-pressure/high-temperature conditions that promote sintering of the diamond particles to form a PCD table bonded to the substrate. The method further includes removing at least a portion of the metal-solvent catalyst from the PCD table.

Other embodiments relate to applications utilizing the disclosed PDCs in various articles and apparatuses, such as rotary drill bits, mining tools and drill bits, bearing apparatuses, wire-drawing dies, machining equipment, and other articles and apparatuses.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to PDCs and methods of fabricating such PDCs. The PDC embodiments disclosed herein may be used in a variety of applications, such as rotary drill bits, mining tools and drill bits, bearing apparatuses, wire-drawing dies, machining equipment, and other articles and apparatuses.

Figure 1A:
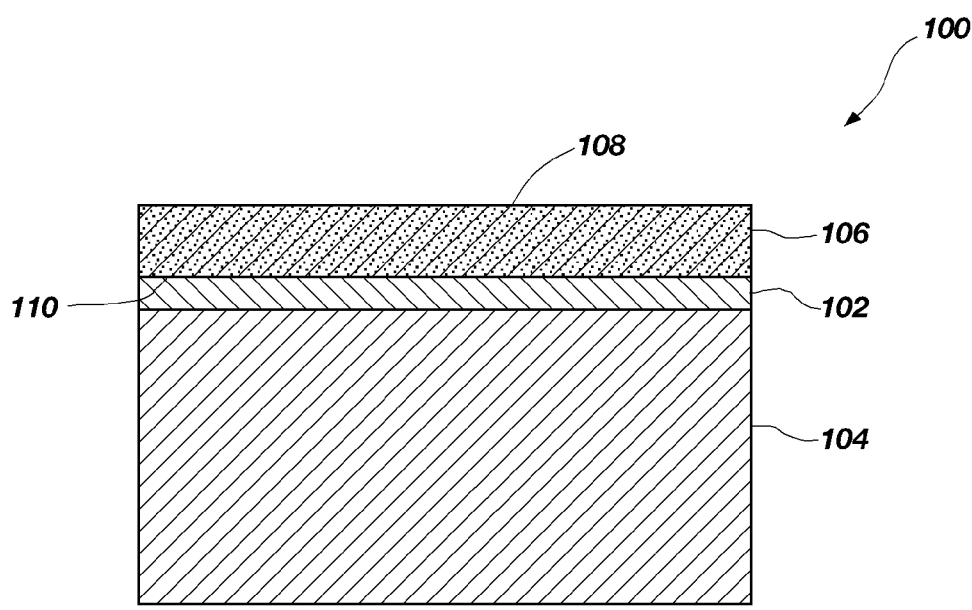
FIGS. 1A-1C are cross-sectional views illustrating various stages in an embodiment of a method for fabricating a PDC and the PDC so-formed.
Figure 1B:
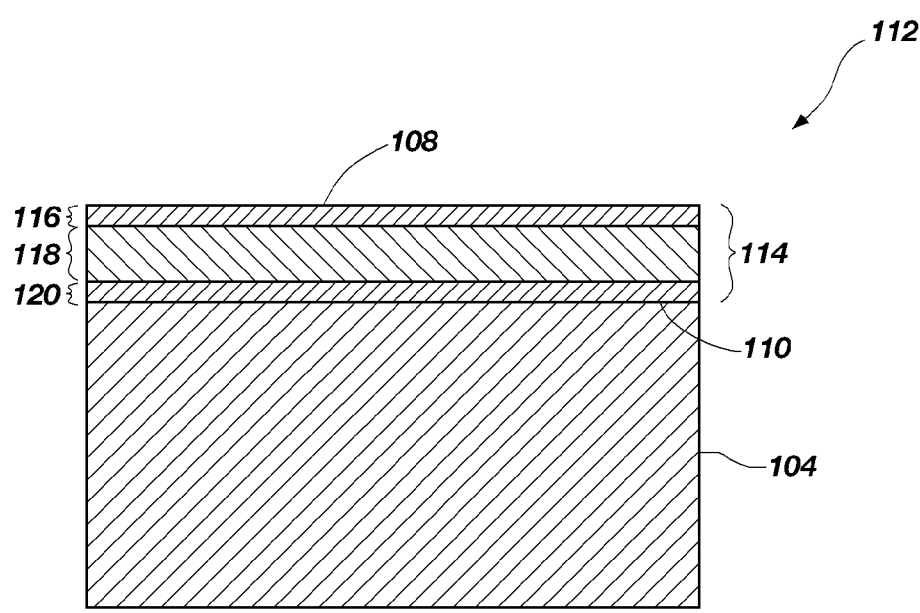
Figure 1C:
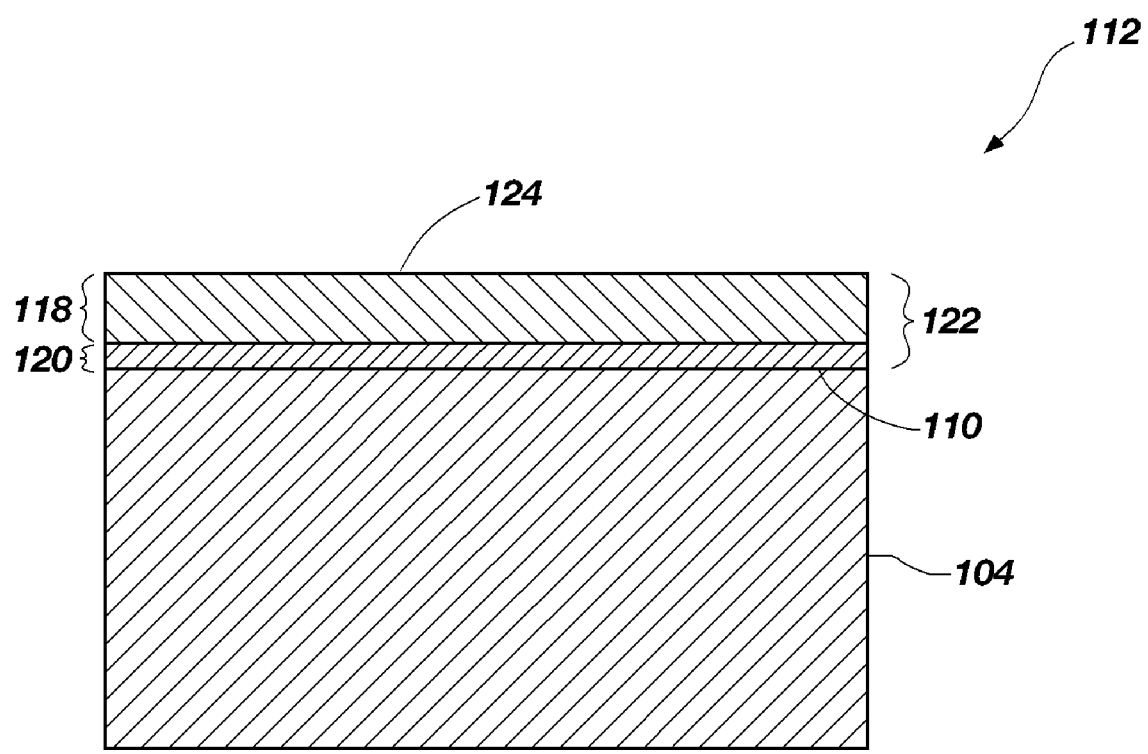

FIGS. 1A-1C are cross-sectional views illustrating various stages in an embodiment of a method for fabricating a PDC and the PDC so-formed. Referring to FIG. 1A, an assembly 100 may be formed by positioning a silicon-cobalt containing layer 102 between a substrate 104 and an at least partially leached PCD table 106. The at least partially leached PCD table 106 includes a first surface 108 and an opposing second interfacial surface 110 positioned adjacent to the silicon-cobalt containing layer 102. The at least partially leached PCD table 106 also includes a plurality of interstitial regions that were previously occupied by a metal-solvent catalyst and form a network of at least partially interconnected pores that extend between the first surface 108 and second interfacial surface 110.

The silicon-cobalt containing layer 102 may comprise a mixture of silicon particles and cobalt particles. In one embodiment, the silicon-cobalt containing layer 102 comprises silicon particles present in an amount of about 50 to about 60 weight percent ("wt %") and cobalt particles present in an amount of about 40 to about 50 wt %. In a more specific embodiment, the silicon-cobalt containing layer 102 comprises silicon particles and cobalt particles present in an amount of about equal to or near a eutectic composition of the silicon-cobalt chemical system. In some embodiments, the silicon particles and cobalt particles may be held together by an organic binder to form a green layer of cobalt and silicon particles. In another embodiment, the silicon-cobalt containing layer 102 may comprise a thin sheet of a silicon-cobalt alloy or a green layer of silicon-cobalt alloy particles formed by mechanical alloying having a low-melting eutectic or near eutectic composition.

The at least partially leached PCD table 106 may be fabricated by subjecting a plurality of diamond particles (e.g., diamond particles having an average particle size between 0.5 μm to about 70 μm) to a HPHT sintering process in the presence of a metal-solvent catalyst, such as cobalt, nickel, iron, or alloys thereof to facilitate intergrowth between the diamond particles and form a PCD table comprised of bonded diamond grains (i.e., diamond-to-diamond bonding) defining interstitial regions with the metal-solvent catalyst disposed within the interstitial regions. The diamond particles may exhibit a single mode or a bimodal or greater diamond particle size distribution. The as-sintered PCD table may be leached by immersion in an acid, such as aqua-regia, a solution of nitric acid, or subjected to another suitable process to remove at least a portion of the metal-solvent catalyst from the interstitial regions of the polycrystalline diamond table and form the at least partially leached PCD table 106. For example, the as-sintered PCD table may be immersed in the acid for about 2 to about 7 days (e.g., about 3, 5, or 7 days).

Suitable materials for the substrate 104 include, without limitation, cemented carbides including titanium carbide, niobium carbide, tantalum carbide, vanadium carbide, tungsten carbide, and combinations of any of the preceding carbides cemented with iron, nickel, cobalt, or alloys thereof. For example, the substrate 104 may comprise a cemented-carbide material, such as a cobalt-cemented tungsten carbide material and/or another suitable material.

As a result of the leaching process used to remove the metal-solvent catalyst, the at least partially leached PCD table 106 may include leaching by-products. For example, the solution used to remove, for example, cobalt from the interstitial regions may leave one or more types of residual salts, one or more types of oxides, combinations of the foregoing, or another leaching by-product within at least some of the interstitial regions of the at least partially leached PCD table 106. For example, depending upon the chemistry of the leaching solution, the leaching by-products may comprise a salt of nitric acid, a salt of hydrochloric acid, a salt of phosphoric acid, a salt of acetic acid, a metal oxide, or mixtures of the foregoing. For example, the salt may be cobalt nitrate, cobalt chloride, or combinations thereof. For example, the metal oxide may comprise an oxide of tungsten, an oxide of cobalt, or an oxide of any metal-solvent catalyst, and/or an oxide of another type of metal present in the catalyst of the at least partially leached PCD table 106 prior to leaching. It is currently believed that such leaching by-products may block, obstruct, or otherwise inhibit infiltration of the at least partially leached PCD table 106 with a catalyst, such as cobalt, when the at least partially leached PCD table 106 is bonded to a substrate. Additionally, such leaching by-products may inhibit back filling with a non-catalyst material such as silicon.

The assembly 100 may be placed in a pressure transmitting medium, such as a refractory metal can, graphite structure, pyrophyllite or other pressure transmitting structure, or another suitable container or supporting element. The pressure transmitting medium, including the assembly 100, may be subjected to a HPHT process using a HPHT press to create temperature and pressure conditions at which diamond is stable. The temperature of the HPHT process may be at least about 1000° Celsius (e.g., about 1300° Celsius to about 1600° Celsius) and the pressure of the HPHT process may be at least 4.0 GPa (e.g., about 5.0 GPa to about 9.0 GPa) for a time sufficient to bond the at least partially leached PCD table 106 to the substrate 104 and form an intermediate PDC 112 as shown in FIG. 1B having an infiltrated PCD table 114 bonded to the substrate 104.

The temperature of the HPHT process is sufficient to cause the silicon-cobalt containing layer 102 to melt and a liquid comprising silicon and cobalt infiltrates into the interstitial regions of the at least partially leached PCD table 106. As the liquefied silicon-cobalt containing material infiltrates the at least partially leached PCD table 106, leaching by-products present in the at least partially leached PCD table 106 and/or other fabrication by-products (e.g., hydrogen or other gases from air) may be driven toward the first surface 108 into a thin waste region 116. As used herein, the phrase "fabrication by-products" encompasses leaching by-products generated during leaching of metal-solvent catalyst from a PCD table to form an at least partially leached PCD table and gaseous impurities that become trapped inside a PCD table during HPHT bonding of an at least partially leached PCD table to a substrate. An intermediate region 118 of the PCD table 116 is substantially free of the fabrication by-products and includes at least one of the following materials disposed in the interstitial regions thereof: a silicon-cobalt alloy, silicon carbide, cobalt carbide, and a mixed carbide of silicon and cobalt. For example, the silicon-cobalt alloy may include a silicon phase and cobalt silicide phase, such as $CoSi_2$. Silicon carbide, cobalt carbide, and a mixed carbide of silicon and cobalt may be formed by silicon, cobalt, and a silicon-cobalt alloy, respectively, by reacting with diamond grains of the at least partially leached PCD table 106 during the HPHT process. The temperature of the HPHT process is also sufficient to liquefy a metal-solvent catalyst (e.g., cobalt, nickel, iron, or alloys thereof) in the substrate 104 and infiltrate the interstitial regions of the at least partially leached PCD table 106. The metal-solvent catalyst infiltrated from the substrate 104 occupies the interstitial regions in a region 120 adjacent to the substrate 104 to form a strong metallurgical bond between the PCD table 114 and the substrate 104. In some embodiments, the volume of the silicon-cobalt containing layer 102 may be selected so that region 120 is relatively thin compared to the intermediate region 118, and infiltrated material from the silicon-cobalt containing layer 102 occupies at least a majority of the interstitial regions of the PCD table 114.

Referring to FIG. 1C, the thin waste region 116 may be removed from the PCD table 114 using a suitable material removal process to form a working region 122 including a working surface 124 that may come into contact with a subterranean formation during drilling. For example, suitable material removal processes include grinding, lapping, and electro-discharge machining. The working region 122 may still be considered thermally stable because the cobalt may be present in the form of a carbide, a mixed carbide, a silicide, or combinations thereof and cobalt in such forms does not substantially function to detrimentally affect the diamond during use. Furthermore, because substantially all of the fabrication by-products present in the at least partially leached PCD table 106 may be driven into the thin waste region 116 and subsequently removed, the PCD table 114 lacks an intermediate contaminant region therein having fabrication by-products. Such an intermediate contaminant region may be of indeterminate shape/dimensions and located below the working surface 124 and between the interfacial surface 110 and the working surface 124. For example, such an intermediate contaminant region having a thickness significantly less than the thickness of the PCD table 114 and located about halfway between the working surface 124 and the interfacial surface 110 of the PCD table 114. An intermediate contaminant region including fabrication by-products may be formed when silicon is infiltrated into the at least partially leached PCD table 106 from the first surface 108 and metal-solvent catalyst is infiltrated into the at least partially leached PCD table 106 from the second surface 110 because the fabrication by-products may be driven to an intermediate contaminant region between the first and second surfaces 108 and 110. Moreover, such an intermediate contaminant region often may include stress cracks therein that may result in premature mechanical failure. Accordingly, the PCD table 114 may also lack stress cracks at an intermediate depth therein.

It is also noted that the transitional stresses between the intermediate region 118 and region 120 may be lessened compared to if cobalt were not present in the silicon-cobalt containing layer 102. It is currently believed that the transition stresses are moderated because of the presence of cobalt in the interstitial regions of the intermediate region 118, which moderates the transitional stresses from the intermediate region 118 to the region 120 so that stress cracks do not generally occur at the interface between the intermediate region 118 and region 120.

In another embodiment, the at least partially leached PCD table 106 may be positioned between the substrate 104 and silicon-cobalt containing layer 102 to form an assembly. The assembly may be subjected to a HPHT process using the same or similar conditions used to HPHT process the assembly 100 to form a PDC. The PDC so-formed includes a PCD table having the same or very similar construction as the PCD table shown in FIG. 1C. Optionally, the assembly may be vacuum sealed. Vacuum sealing the assembly may prevent impurities from air becoming entrapped in the at least partially leached PCD table 106 during the HPHT process because infiltration by material from the silicon-cobalt containing layer 102 will not drive such fabrication by-products into an upper waste region that can be removed unlike the embodiment described with respect to FIGS. 1A-1C. The at least partially leached PCD table 106 may be cleaned, prior to HPHT bonding to the substrate 104 to remove leaching by-products therefrom, using any of the cleaning techniques disclosed in U.S. patent application Ser. No. 12/120,949, the disclosure of which is incorporated herein, in its entirety, by this reference.

Figure 2A:
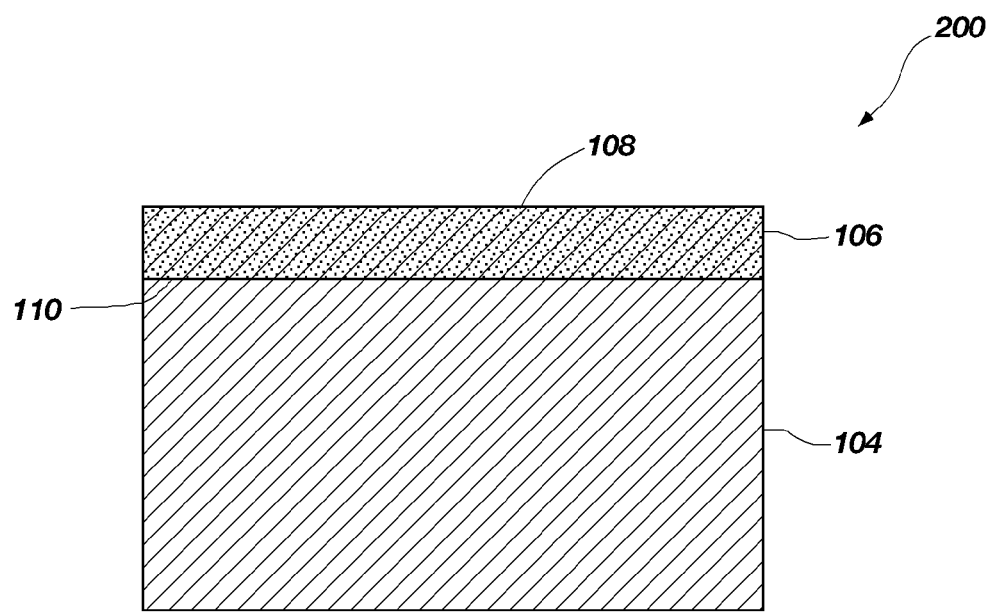
FIGS. 2A and 2B are cross-sectional views illustrating various stages in an embodiment of a method for fabricating a PDC by only partially infiltrating an at least partially leached PCD table with metal-solvent catalyst and the PDC so-formed.
Figure 2B:
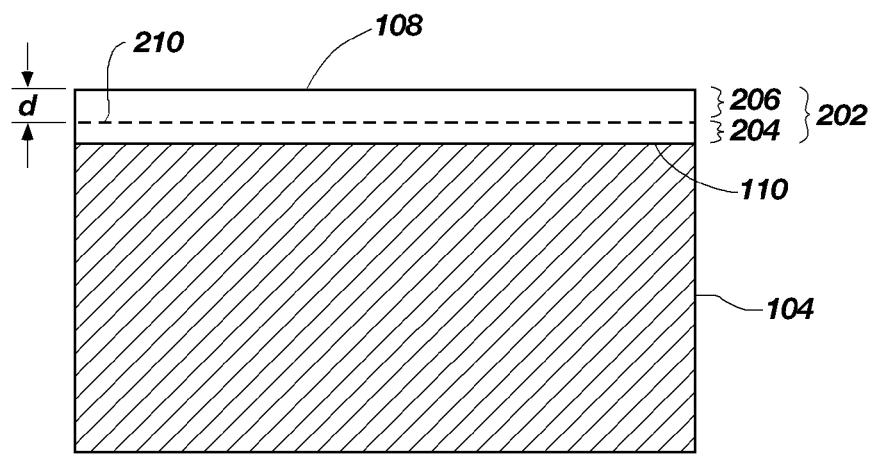

FIGS. 2A and 2B are cross-sectional views illustrating various stages in an embodiment of a method for fabricating a PDC by only partially infiltrating an at least partially leached PCD table with metal-solvent catalyst and the PDC so-formed. Referring to FIG. 2A, an at least partially leached PCD table 106 is formed and provided as previously described with respect to FIGS. 1A-1C. An assembly 200 is formed by positioning the at least partially leached PCD table 106 adjacent to a substrate 104 that includes a metal-solvent catalyst therein, such as a cobalt-cemented tungsten carbide substrate.

Referring to FIG. 2B, the assembly 200 may be subjected to a HPHT process to partially infiltrate the at least partially leached PCD table 106 with a metal-solvent catalyst infiltrant from the substrate 104 to no further than an intermediate location within the at least partially leached PCD table 106 to form a partially infiltrated PCD table 202. The metal-solvent catalyst infiltrant occupies the interstitial regions between bonded diamond grains in a proximal region 204 adjacent to the substrate 104 to form a strong metallurgical bonded between the substrate 104 and the interfacial surface 110 of the partially infiltrated PCD table 202. When the substrate 104 is a cemented tungsten carbide substrate, the metal-solvent catalyst infiltrant may sweep in tungsten and/or tungsten carbide. The tungsten may be present in an alloy with the metal-solvent catalyst infiltrant (e.g., a cobalt-tungsten alloy), substantially pure tungsten, and/or as tungsten carbide. A distal region 206 remote from the substrate 104 is substantially free of metal-solvent catalyst infiltrant. However, there may still be residual amounts of metal-solvent catalyst used to fabricate the at least partially leached PCD table 106 that were not removed during the leaching process used to deplete the at least partially leached PCD table 106 of such metal-solvent catalyst. The distal region 206 extends from the first surface 108 (i.e., a working surface) of the partially infiltrated PCD table 202 to an intermediate depth d. The intermediate depth d may be at least about 50 μm, such as about 50 μm to about 2000 μm.

Still referring to FIG. 2B, a boundary 210 between the proximal region 204 and distal region 206 may be apparent from microstructural analysis and structurally distinguishable from a PDC formed by completely infiltrating the at least partially leached PCD table 106 and leaching metal-solvent catalyst from the completely infiltrated PCD table to a depth d. For example, portions of the metal-solvent catalyst infiltrant of the proximal region 204 exposed through at least partially empty interstitial regions of the distal region 206 at the boundary 210 may not exhibit a roughened surface characteristic of being formed by a leaching/etching process. Thus, the portions of the metal-solvent catalyst infiltrant exposed through the distal region have a surface structure characteristic of not being chemically etched. Only partially infiltrating the at least partially leached PCD table 106 eliminates a time consuming and costly manufacturing step of leaching a fully infiltrated PCD table. It is noted that although the boundary 210 is illustrated as being substantially uniform, the boundary 210 may exhibit a non-planar geometry such as an irregular boundary profile.

The distance that the metal-solvent catalyst infiltrant infiltrates into the at least partially leached PCD table 106 may be controlled by selecting the pressure, temperature, and/or process time employed in the HPHT process. In one embodiment, the assembly may be subjected to a temperature of about 1150° Celsius to about 1300° Celsius (e.g., about 1270° Celsius to about 1300° Celsius) and a corresponding pressure that is within the diamond stable region, such as about 5.0 GPa. Such temperature and pressure conditions are lower than temperature and pressure conditions used to fully infiltrate the at least partially leached PCD table 106.

Figure 3A:
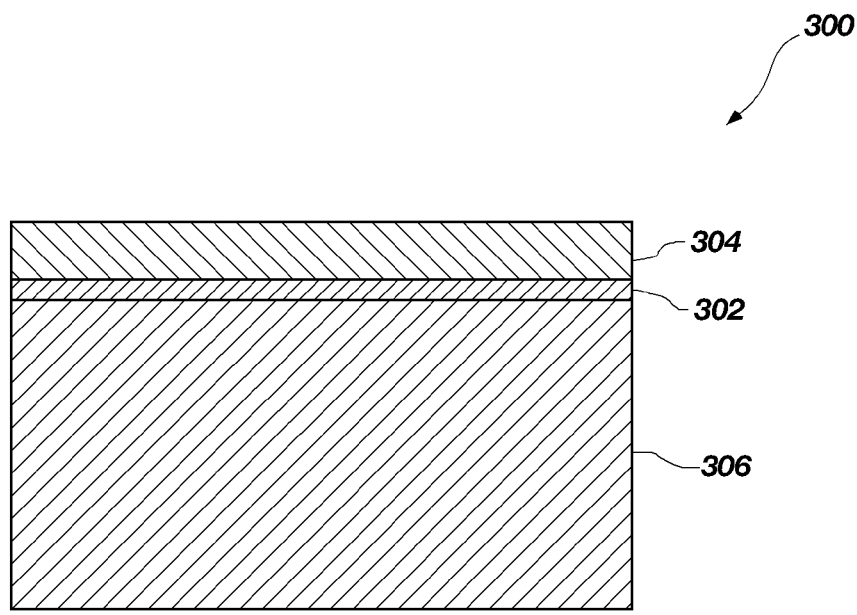
FIGS. 3A-3E are cross-sectional views illustrating various stages in an embodiment of a method for fabricating a PDC and the PDC so-formed.

The at least partially leached PCD table 106 described above in the embodiments shown in FIGS. 1A-1C and 2A-2B may be fabricated by sintering diamond particles in the presence of tungsten and/or tungsten carbide so that tungsten and/or tungsten carbide may be incorporated into the PCD table so-formed. FIGS. 3A-3D are cross-sectional views illustrating various stages in an embodiment of a method for fabricating a PDC including a working region having tungsten and/or tungsten carbide therein and the PDC so-formed. Referring to FIG. 3A, an assembly 300 may be formed by positioning a metal-solvent catalyst layer 302 that is substantially free of tungsten and/or tungsten carbide between a mass of diamond particles 304 and a cemented tungsten carbide substrate 306 (e.g., a cobalt-cemented tungsten carbide substrate). The assembly 300 may be subjected to HPHT conditions that are the same or similar to that used on the assembly 100 shown in FIG. 1A.

Figure 3B:
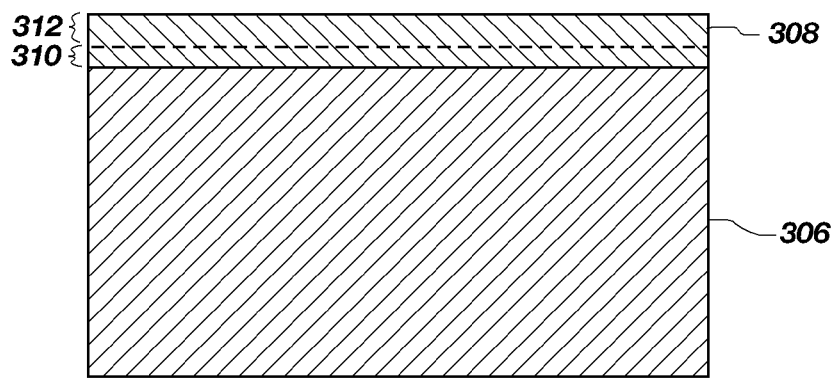

Referring to FIG. 3B, during the HPHT process, metal-solvent catalyst from the metal-solvent catalyst layer 302 may be liquefied and sweeps through the diamond particles 304 to sinter the diamond particles and form a PCD table 308 comprising bonded diamond grains (i.e., diamond-to-diamond bonding) defining interstitial regions. Because the volume of the metal-solvent catalyst layer 302 is selected so that it is not sufficient to fill the volume of all of the interstices between the diamond particles 304, metal-solvent catalyst from the substrate 306 also sweeps in carrying tungsten and/or tungsten carbide from the substrate 306. A PCD table 308 so-formed during HPHT process is bonded to the substrate 306. The PCD table 308 includes a first region 310 adjacent to the substrate 306 that includes tungsten and/or tungsten carbide swept-in from the substrate 306 present in the interstitial regions thereof and a second region 312 remote from the substrate 306 that is substantially free of tungsten and/or tungsten carbide. The tungsten may be present in the first region 310 in a number of different phases, such as one or more of the following phases: a metal-solvent catalyst alloy (e.g., a cobalt-tungsten alloy) including tungsten as an alloying element and substantially pure tungsten. The volume of the metal-solvent catalyst layer 302 may be selected so that the second region 312 exhibits a thickness substantially greater than the first region 310. In this embodiment, the metal-solvent catalyst within the interstitial regions between bonded diamond grains of the PCD table 308 may be leached from the second region 312 relatively easier because it does not have tungsten and/or tungsten carbide therein.

Figure 3C:
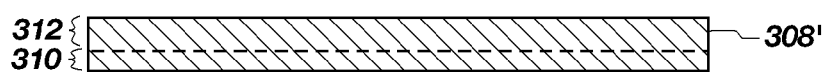
Figure 3D:
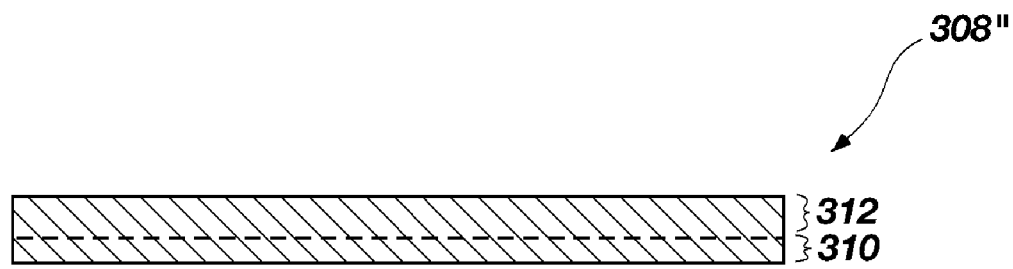

Referring to FIG. 3C, the PCD table 308 may be separated from the substrate 306 by grinding material from the substrate 306 or another suitable material removal process. The separated PCD table 308' may be leached to remove substantially all of the metal-solvent catalyst therefrom to form an at least partially leached PCD table 308" shown in FIG. 3D. For example, the metal-solvent catalyst may be leached from the first region 310 using hydrofluoric acid and the metal-solvent catalyst in the second region 312 may be leached using a less aggressive solution of nitric acid, hydrochloric acid, or mixtures thereof.

Figure 3E:
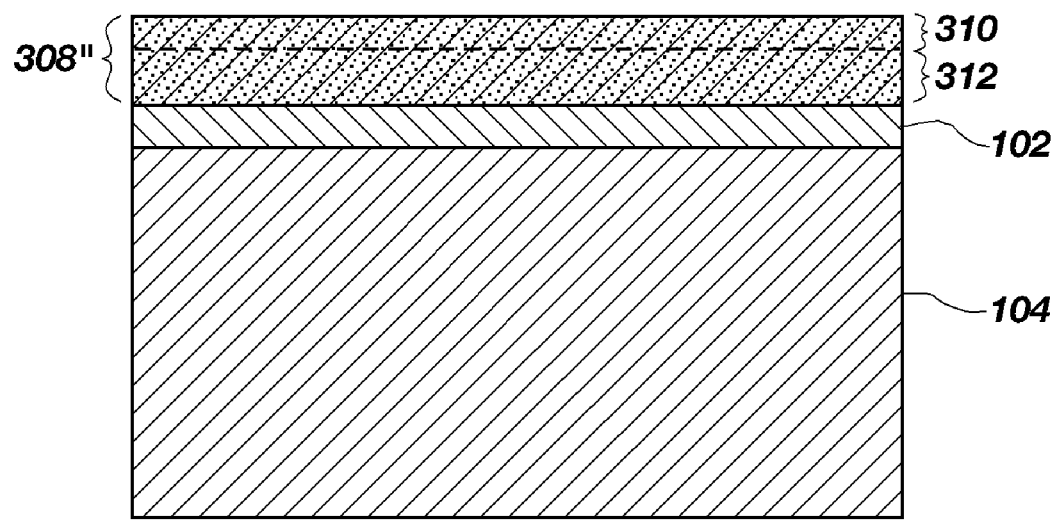

Referring to FIG. 3E, the at least partially leached PCD table 308" may be employed to form a PDC, such as the PDC 112 shown in FIG. 1B, by orienting the second region 312 that is substantially free of tungsten and/or tungsten carbide positioned in proximity to the substrate 104 and adjacent to the silicon-cobalt containing layer 102. The first region 310 of the at least partially leached PCD table 308" that includes tungsten and/or tungsten carbide therein is oriented remote from the substrate 104 so that a working region of a PDC ultimately formed when the assembly shown in FIG. 3E is subject to an HPHT process includes tungsten and/or tungsten carbide to provide a wear resistant working region due to the presence of tungsten and/or tungsten carbide.

In another embodiment, a PCD table similar in construction to the PCD table 308 may be fabricated by positioning the mass of diamond particles 304 between the metal-solvent catalyst layer 302 and cemented tungsten carbide substrate 306 to form an assembly and subjecting the assembly to an HPHT process. The PCD table so-formed may be separated from the substrate 306, leached, and subsequently bonded to another substrate as described above with respect to FIGS. 3C-3E.

Figure 4A:
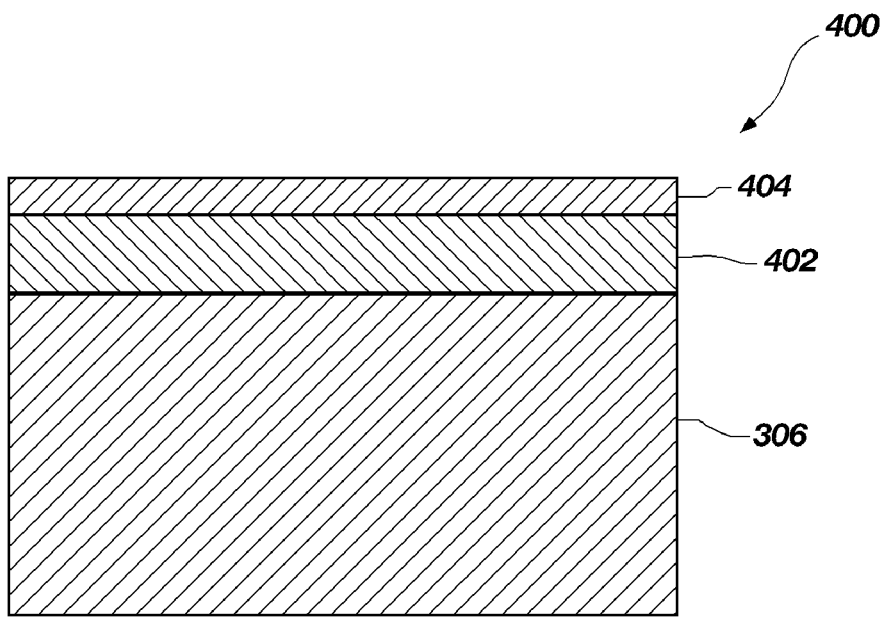
FIGS. 4A-4C are cross-sectional views illustrating various stages in an embodiment of a method for fabricating a PDC in a single HPHT process and the PDC so-formed.
Figure 4B:
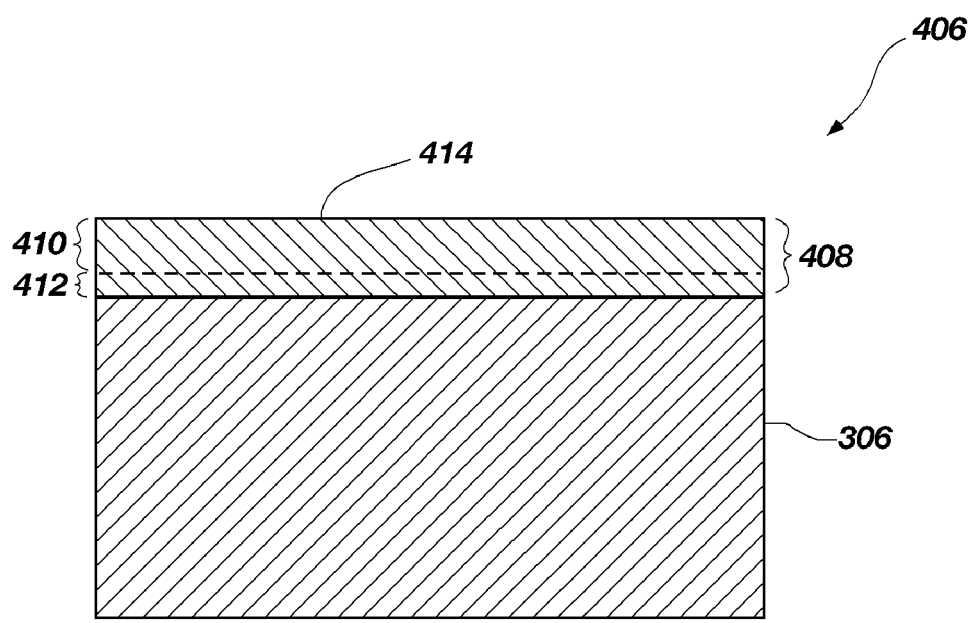
Figure 4C:
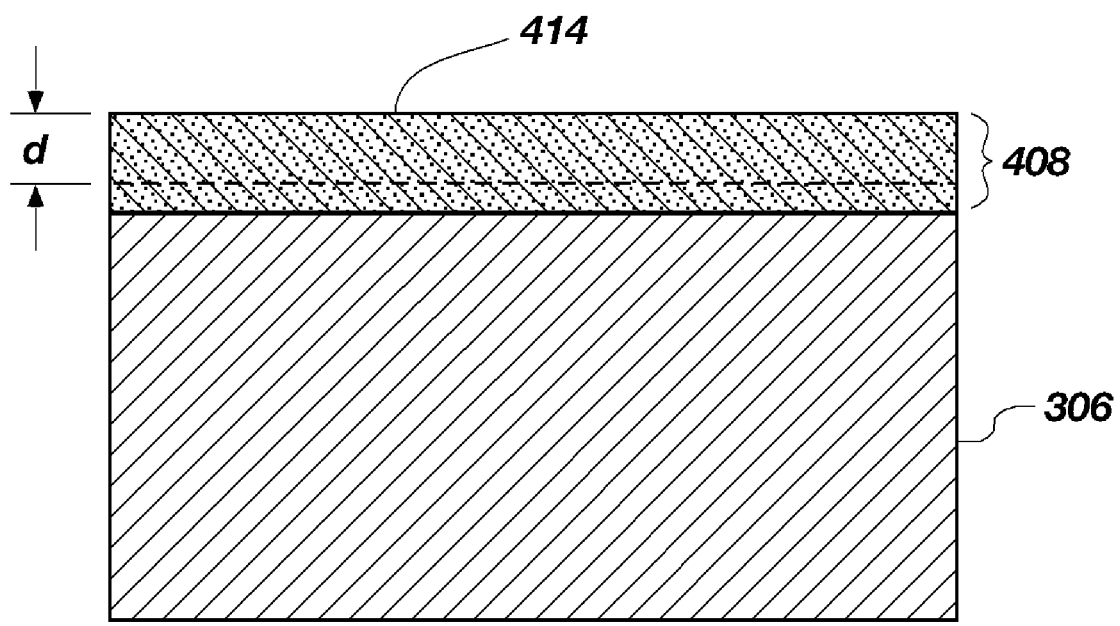

FIGS. 4A-4C are cross-sectional views illustrating various stages in an embodiment of a method for fabricating a PDC in a single HPHT process and the PDC so-formed. Referring to FIG. 4A, an assembly 400 may be formed by positioning a mass of diamond particles 402 between a cemented tungsten carbide substrate 306 and a metal-solvent catalyst layer 404 that is substantially free of tungsten and/or tungsten carbide. In one embodiment, the metal-solvent catalyst layer 404 may comprise a thin foil of cobalt, nickel, iron, or alloys thereof that is substantially free of tungsten and/or tungsten carbide. In another embodiment, the metal-solvent catalyst layer 404 may comprise a green layer of particles of cobalt, nickel, iron, alloys thereof, or combinations thereof that are substantially free of tungsten and/or tungsten carbide. The assembly 400 may be subjected to HPHT conditions similar to the HPHT conditions used for HPHT processing the assembly 100 shown in FIG. 1A.

Referring to FIG. 4B, a PDC 406 is formed during the HPHT process including a PCD table 408 bonded to the substrate 306. During the HPHT process, the metal-solvent catalyst layer 404 is liquefied an infiltrates into voids between diamond particles of the mass of diamond particles 402 to effect intergrowth between the diamond particles to thereby form bonded diamond grains defining interstitial regions. The infiltrated metal-solvent catalyst from the metal-solvent catalyst layer 404 occupies the interstitial regions between the bonded diamond grains within an upper region 410. The upper region 410 may exhibit a thickness of about 150 µm to about 750 µm, such as about 250 µm to about 500 µm. The HPHT process may also liquefy a metal-solvent catalyst constituent of the substrate 306 that infiltrates into the mass of diamond particles 402 to effect intergrowth between the diamond particles thereby forming bonded diamond grains (i.e., diamond-to-diamond bonding) defining interstitial regions in a lower region 412 adjacent to the substrate 306. The infiltrated metal-solvent catalyst constituent from the substrate 306 occupies the interstitial regions between the bonded diamond grains within the lower region 412. The metal-solvent catalyst constituent that infiltrates from the substrate 306 may also carry tungsten and/or tungsten carbide. Accordingly, the metal-solvent catalyst constituent solidified within the interstitial regions of the lower region 412 includes tungsten and/or tungsten carbide.

Referring to FIG. 4C, the PCD table 408 may be subjected to a leaching process to remove metal-solvent catalyst from at least a portion of the PCD table 408. The metal-solvent catalyst infiltrated into the mass of diamond particles 402 from the metal-solvent catalyst layer 404 is substantially free of tungsten and/or tungsten carbide, thereby enabling relatively faster, deeper, and/or more effective leaching than the metal-solvent catalyst occupying the interstitial regions of the lower region 412. In one embodiment, substantially all of the metal-solvent catalyst of the upper region 410 may be selectively removed to a depth d measured from a working surface 414 of the PCD table 408. For example, one suitable leaching acid is a nitric acid solution. In one embodiment, the depth d may be about 150 µm to about 750 µm (e.g., about 250 µm to about 500 µm) corresponding approximately to the thickness of the upper region 410. By way of example, if the metal-solvent catalyst layer 404 was omitted and metal-solvent catalyst from the substrate 306 swept completely through the diamond particles 402 carrying tungsten and/or tungsten carbide, a PCD table so-formed may only be leached to a depth of about 200 µm even with leaching times in excess of 7 days. Thus, forming the upper region 410 to be substantially free of tungsten and/or tungsten carbide enables obtaining a leach depth d in the PCD table 408 equal to or greater than a leach depth in a PCD table that has tungsten and/or tungsten carbide was distributed uniformly therethrough for a given leaching time. If desired, in some embodiments, the metal-solvent catalyst present in the lower region 412 may also be depleted using a more aggressive acid, such as a hydrochloric acid.

Figure 9:
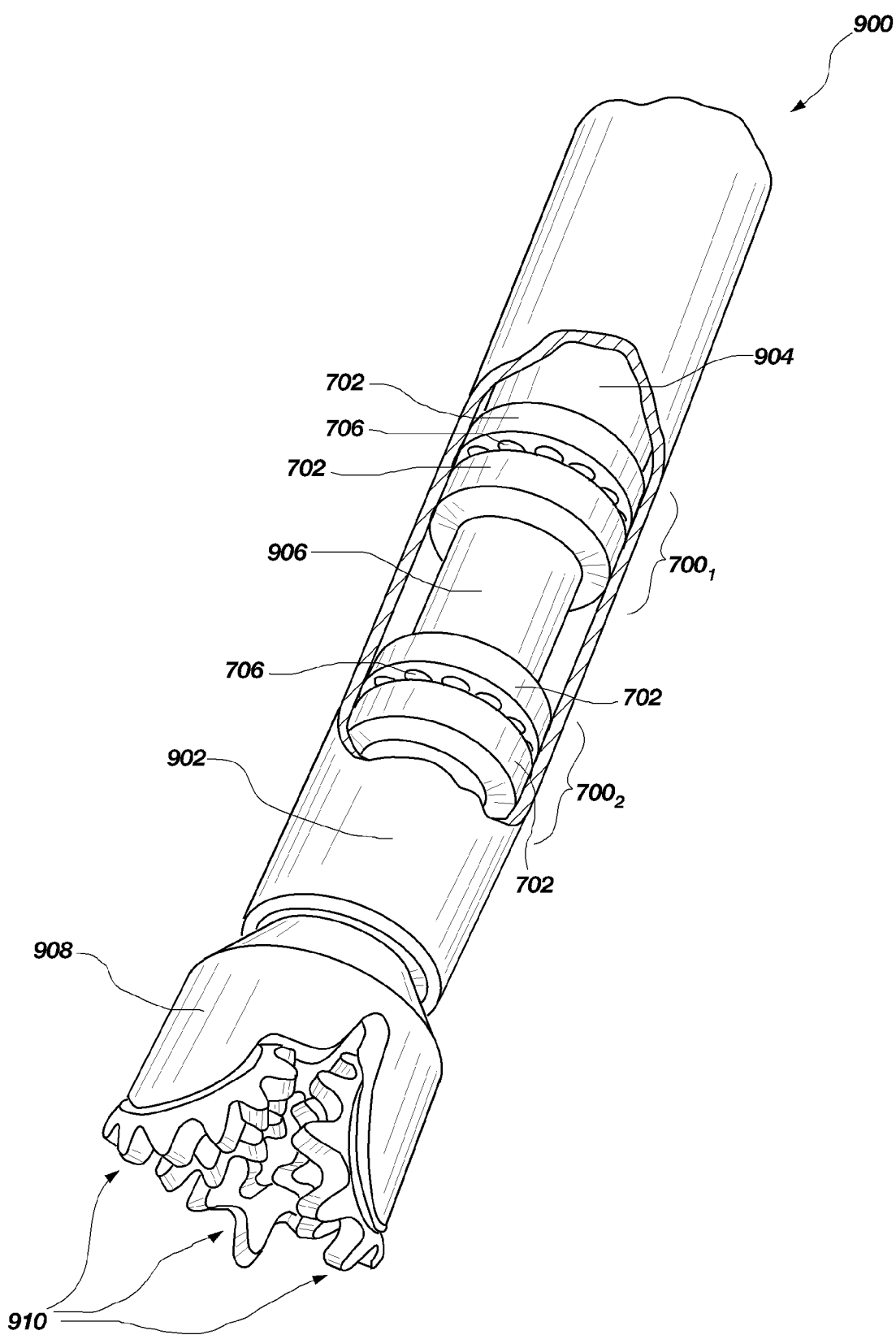
FIG. 9 is a schematic isometric cut-away view of an embodiment of a subterranean drilling system including the thrust-bearing apparatus shown in FIG. 7.
Figure 10:
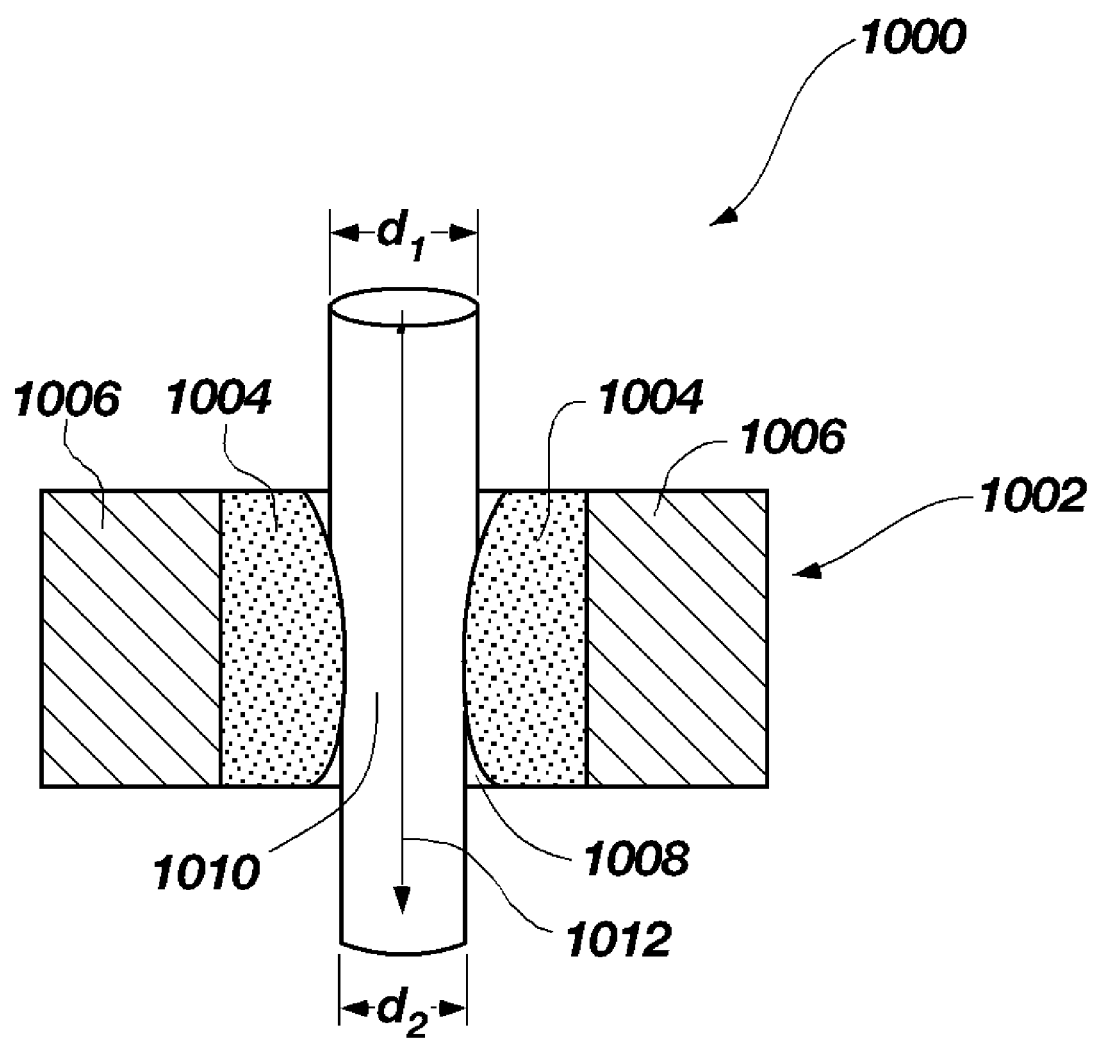
FIG. 10 is a side cross-sectional view of an embodiment of a wire-drawing die that employs a PDC fabricated in accordance with the principles described herein.

The disclosed PDC embodiments may be used in a number of different applications including, but not limited to, use in a rotary drill bit (FIGS. 5A and 5B), a mining rotary drill bit (FIGS. 6A-6C), a thrust-bearing apparatus (FIG. 7), a radial bearing apparatus (FIG. 8), a subterranean drilling system (FIG. 9), and a wire-drawing die (FIG. 10). It should be emphasized that the various applications discussed above are merely some examples of applications in which the PDC embodiments may be used. Other applications are contemplated, such as employing the disclosed PDC embodiments in friction stir welding tools.

Figure 5A:
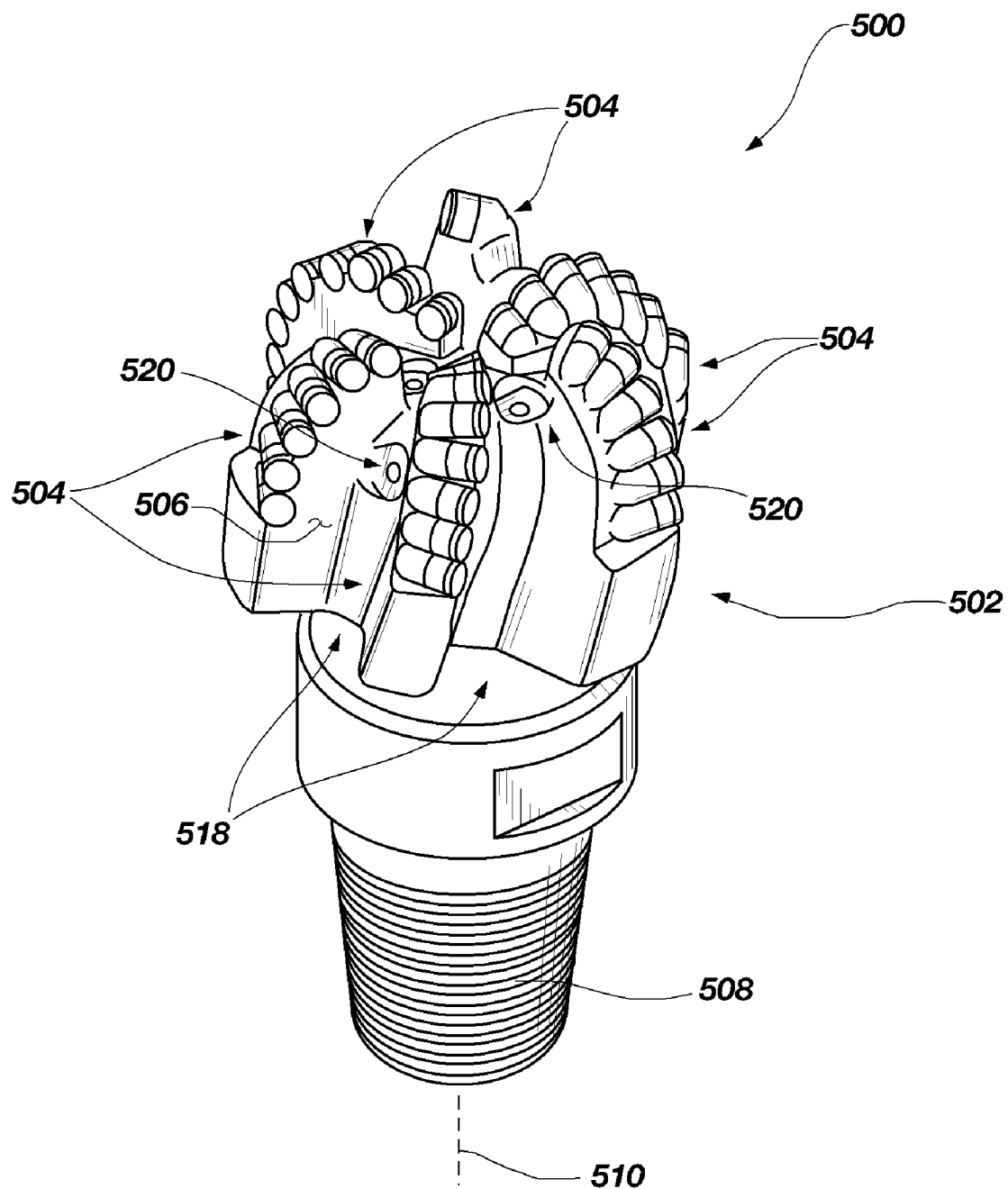
FIG. 5A is an isometric view of an embodiment of a rotary drill bit that may employ one or more of the disclosed PDC embodiments.
Figure 5B:
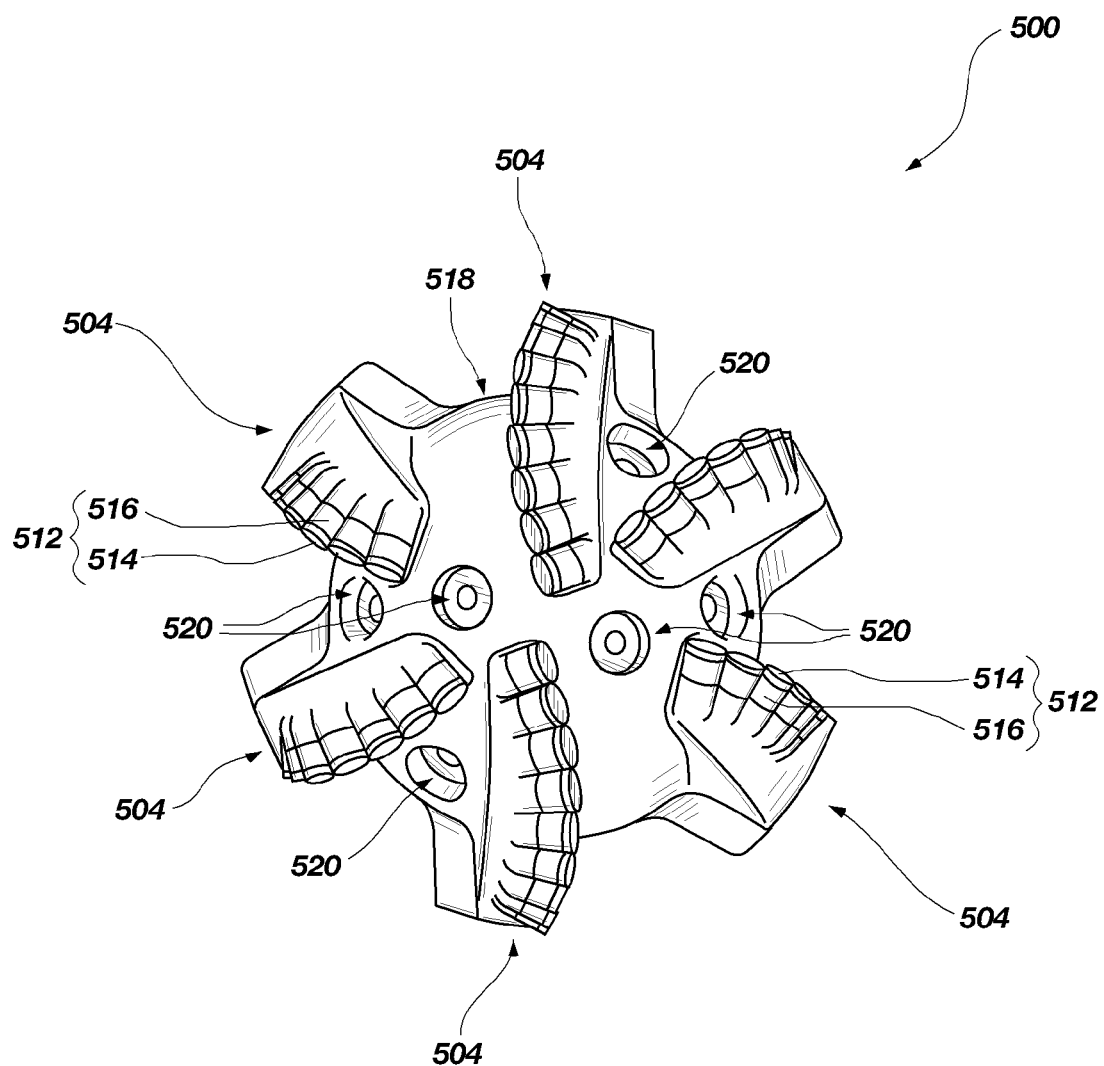
FIG. 5B is a top elevation view of the rotary drill bit shown in FIG. 5A.

FIG. 5A is an isometric view and FIG. 5B is a top elevation view of an embodiment of a rotary drill bit 500. The rotary drill bit 500 includes at least one PDC configured according to any of the previously described PDC embodiments. The rotary drill bit 500 comprises a bit body 502 that includes radially and longitudinally extending blades 504 with leading faces 506, and a threaded pin connection 508 for connecting the bit body 502 to a drilling string. The bit body 502 defines a leading end structure for drilling into a subterranean formation by rotation about a longitudinal axis 510 and application of weight-on-bit. At least one PDC cutting element, configured according to any of the previously described PDC embodiments (e.g., the PDC 112 shown in FIG. 1C), may be affixed to rotary drill bit 500. With reference to FIG. 5B, a plurality of PDCs 512 are secured to the blades 504. For example, each PDC 512 may include a PCD table 514 bonded to a substrate 516. More generally, the PDCs 512 may comprise any PDC disclosed herein, without limitation. In addition, if desired, in some embodiments, a number of the PDCs 512 may be conventional in construction. Also, circumferentially adjacent blades 504 define so-called junk slots 518 therebetween, as known in the art. Additionally, the rotary drill bit 500 may include a plurality of nozzle cavities 520 for communicating drilling fluid from the interior of the rotary drill bit 500 to the PDCs 512.

Figure 6A:
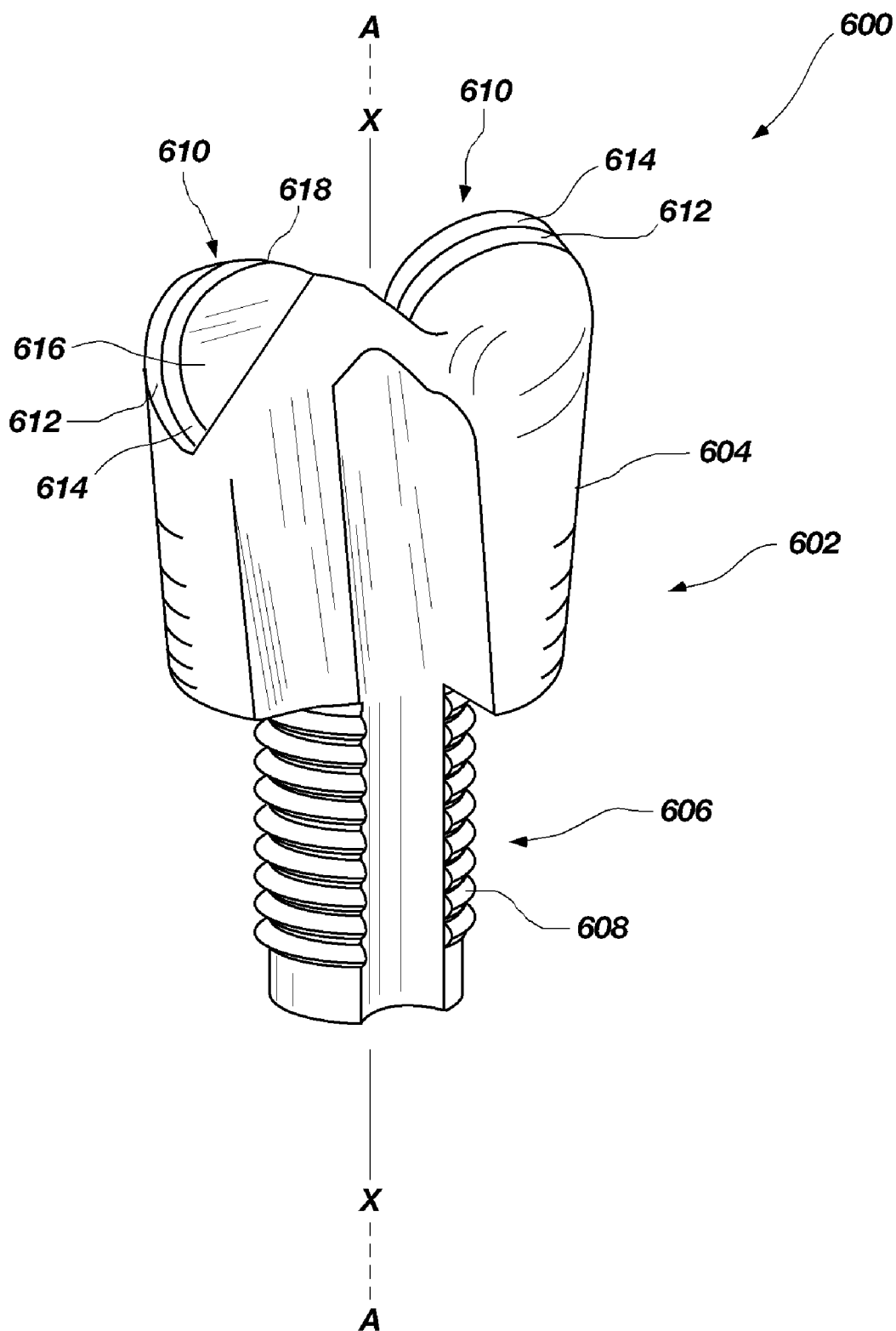
FIG. 6A is a perspective view of an embodiment of a mining rotary drill bit.
Figure 6B:
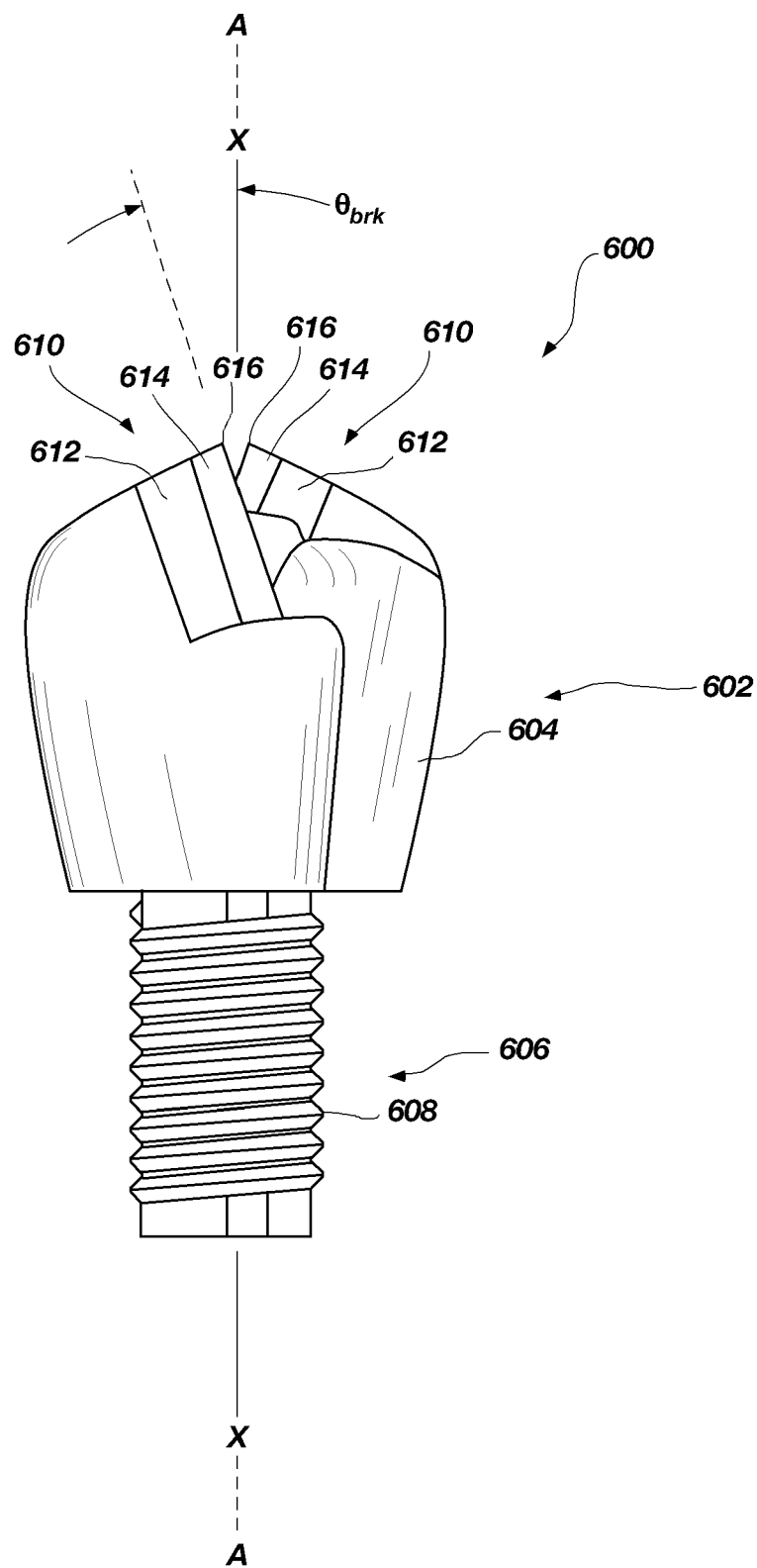
FIG. 6B is a side elevation view of the mining rotary drill bit shown in FIG. 6A.
Figure 6C:
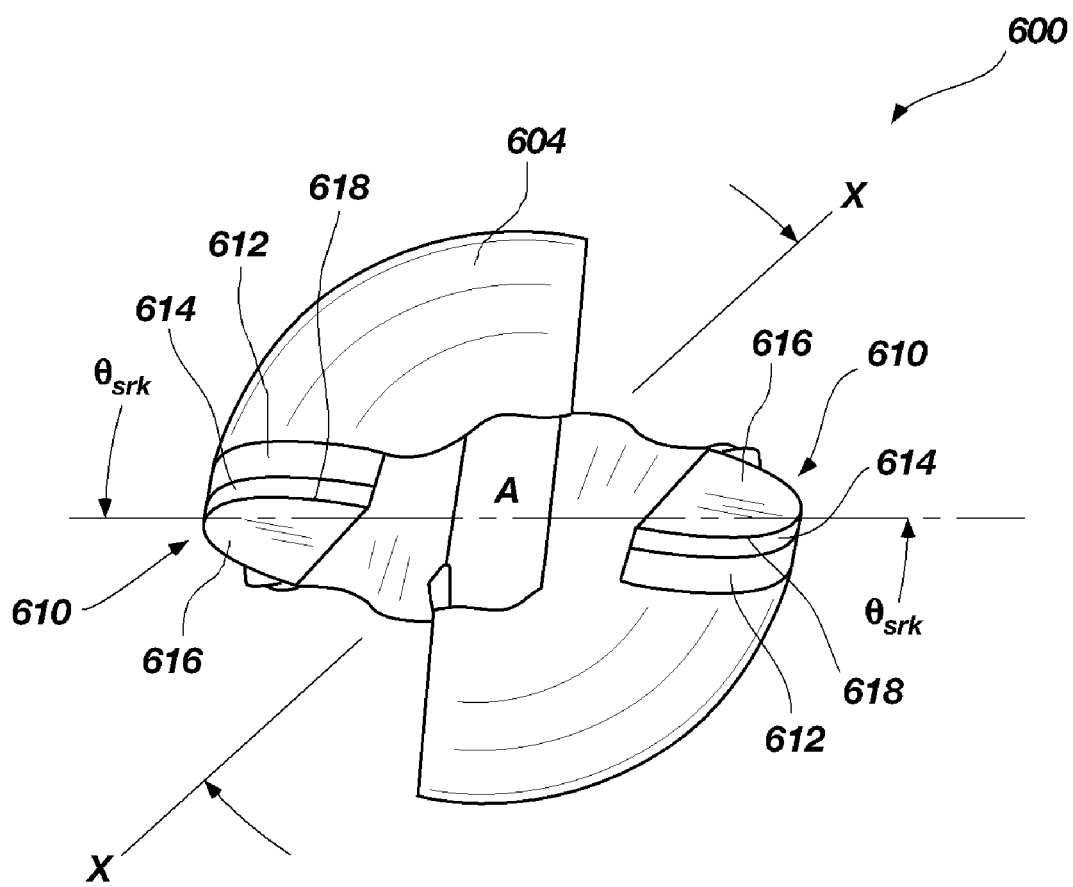
FIG. 6C is a top elevation view of the mining rotary drill bit shown in FIG. 6A.

FIGS. 6A-6C are, respectively, a perspective view, a side elevation view, and a top elevation view of an embodiment of a mining rotary drill bit 600. The rotary drill bit 600 is suitably configured for drilling boreholes in a formation (i.e., configured as a roof drill bit), such as drilling boreholes in an unsupported roof of a tunnel in, for example, a coal mine. The rotary drill bit 600 includes a bit body 602 that may be formed from a machinable steel, a hardfaced bit body, and an infiltrated-carbide material (e.g., infiltrated tungsten carbide or so-called "matrix" material). The bit body 602 includes a head portion 604 and a shaft portion 606 extending from the head portion 604. The shaft portion 606 may include threads 608 or another suitable coupling portion configured for connecting the rotary drill bit 600 to a drilling machine (not shown) operable to rotate the rotary drill bit 600 about the rotation axis A and apply a thrust load along the rotation axis A to drill a borehole in a formation.

One or more PDCs 610 may be mounted to corresponding mounting portions formed in the head portion 604 by, for example, brazing or press-fitting within a pocket or recess (not shown) formed in the bit body 602. Each PDC 610 may be configured according to any of the PDC embodiments disclosed herein, such as the PDC 112 shown in FIG. 1C. Each PDC 610 includes a substrate 612 bonded to a PCD table 614. Each PCD table 614 may each include a generally planar working surface 616 and a peripheral cutting edge 618. According to various embodiments, each peripheral cutting edge 618 may define an arc (e.g., an arcuate edge forming an arc of about 900 to about 1900), may define part of a perimeter of a triangle (e.g., substantially linear edges that intersect), may define part of perimeter of a rectangle, may define part of a perimeter of an oval, or may define part of a perimeter of another selected shape. Each cutting edge 618 may extend to a location at or proximate to the rotation axis A or pass through the rotation axis A to eliminate any coring effect during drilling of a formation.

The working surface 616 of each PDC 610 may be oriented in generally opposite directions, and further oriented at a selected negative back rake angle, $\theta_{brk}$ and at a selected negative side rake angle, $\theta_{srk}$ to place the working surfaces 616 predominately in compression during drilling a formation. Referring to FIG. 6B, each working surface 616 may be tilted about a reference axis by the negative back rake angle, $\theta_{brk}$, with the negative back rake angle, $\theta_{brk}$, being the angle between one of the working surfaces 616 and a reference plane x-x. The reference axis is generally perpendicular to the rotation axis A and lies in the reference plane x-x with the rotation axis A. In one embodiment, the negative back rake angle, $\theta_{brk}$, may be about 5 degrees to about 35 degrees, and more particularly about 10 degrees to about 25 degrees. Referring to FIG. 6C, each working surface 616 may also tilted about the rotation axis A by the negative side rake angle, $\theta_{srk}$, with the negative side rake angle, $\theta_{srk}$, being the angle between one of the working surfaces 616 and the reference plane x-x. In one embodiment, the negative side rake angle, $\theta_{srk}$, may be about 2 degrees to about 20 degrees, more particularly about 4 degrees to about 10 degrees, and even more particularly about 4 degrees to about 9 degrees.

FIGS. 5A-5B and 6A-6C are merely a few of many possible embodiments of rotary drill bits that may employ at least one cutting element fabricated and structured in accordance with the disclosed PDC embodiments, without limitation. Other earth-boring tools or drilling tools, including, for example, core bits, roller-cone bits, fixed-cutter bits, eccentric bits, bicenter bits, reamers, reamer wings, or any other downhole tool including PDCs, without limitation, may employ at least one cutting element that comprises a PDC fabricated and structured in accordance with the disclosed embodiments.

The PDC embodiments disclosed herein (e.g., the PDC 112 shown in FIG. 1C) may also be utilized in applications other than rotary drill bits. For example, the disclosed PDC embodiments may be used in thrust-bearing assemblies, radial bearing assemblies, wire-drawing dies, artificial joints, machining elements, and heat sinks.

Figure 7:
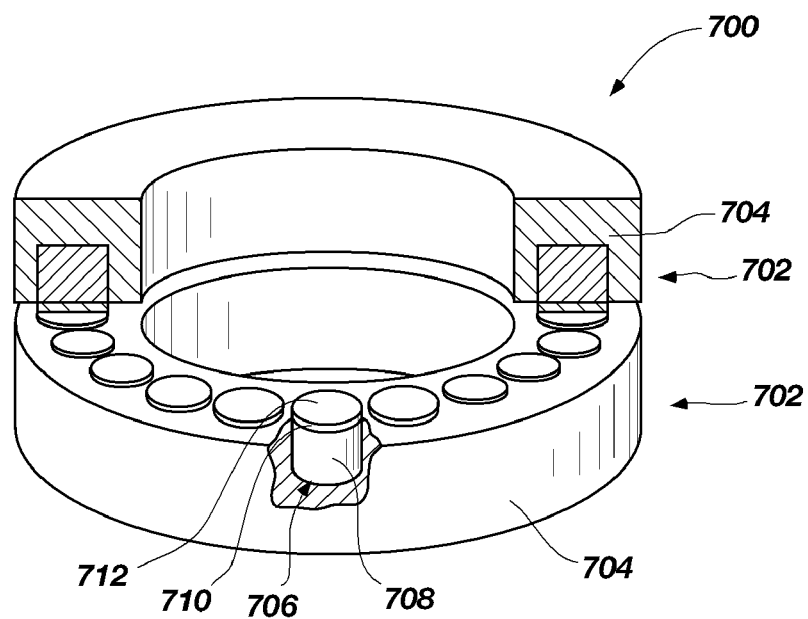
FIG. 7 is an isometric cut-away view of an embodiment of a thrust-bearing apparatus that may utilize any of the disclosed PDC embodiments as bearing elements.

FIG. 7 is an isometric cut-away view of an embodiment of a thrust-bearing apparatus 700 that may utilize any of the disclosed PDC embodiments as bearing elements. The thrust-bearing apparatus 700 includes respective thrust-bearing assemblies 702. Each thrust-bearing assembly 702 includes an annular support ring 704 that may be fabricated from a material, such as carbon steel, stainless steel, or another suitable material. Each support ring 704 includes a plurality of recesses (not labeled) that receives a corresponding bearing element 706. Each bearing element 706 may be mounted to a corresponding support ring 704 within a corresponding recess by brazing, press-fitting, using fasteners, or another suitable mounting technique. One or more, or all of bearing elements 706 may be configured according to any of the disclosed PDC embodiments. For example, each bearing element 706 may include a substrate 708 and a PCD table 710, with the PCD table 710 including a bearing surface 712.

In use, the bearing surfaces 712 of one of the thrust-bearing assemblies 702 bears against the opposing bearing surfaces 712 of the other one of the bearing assemblies 702. For example, one of the thrust-bearing assemblies 702 may be operably coupled to a shaft to rotate therewith and may be termed a "rotor." The other one of the thrust-bearing assemblies 702 may be held stationary and may be termed a "stator."

Figure 8:
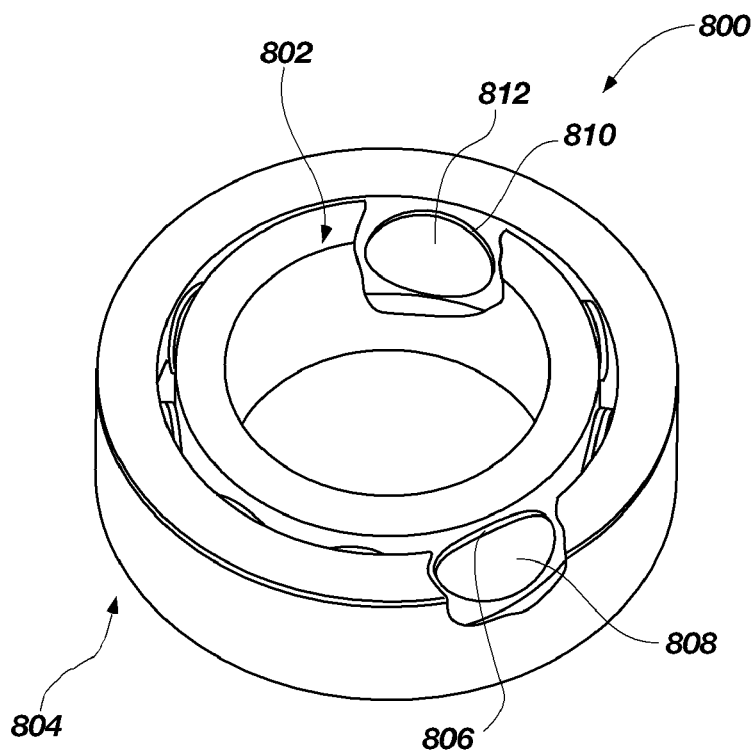
FIG. 8 is an isometric cut-away view of an embodiment of a radial bearing apparatus that may utilize any of the disclosed PDC embodiments as bearing elements.

FIG. 8 is an isometric cut-away view of an embodiment of a radial bearing apparatus 800 that may utilize any of the disclosed PDC embodiments as bearing elements. The radial bearing apparatus 800 includes an inner race 802 positioned generally within an outer race 804. The outer race 804 includes a plurality of bearing elements 806 affixed thereto that have respective bearing surfaces 809. The inner race 802 also includes a plurality of bearing elements 810 affixed thereto that have respective bearing surfaces 812. One or more, or all of the bearing elements 806 and 810 may be configured according to any of the PDC embodiments disclosed herein. The inner race 802 is positioned generally within the outer race 804 and, thus, the inner race 802 and outer race 804 may be configured so that the bearing surfaces 808 and 812 may at least partially contact one another and move relative to each other as the inner race 802 and outer race 804 rotate relative to each other during use.

The radial-bearing apparatus 800 may be employed in a variety of mechanical applications. For example, so-called "roller cone" rotary drill bits may benefit from a radial-bearing apparatus disclosed herein. More specifically, the inner race 802 may be mounted or affixed to a spindle of a roller cone and the outer race 804 may be affixed to an inner bore formed within a cone and that such an outer race 804 and inner race 802 may be assembled to form a radial-bearing apparatus.

Referring to FIG. 9, the thrust-bearing apparatus 700 and/or radial bearing apparatus 800 may be incorporated in a subterranean drilling system. FIG. 9 is a schematic isometric cut-away view of an embodiment of a subterranean drilling system 900 that includes at least one of the thrust-bearing apparatuses 600 shown in FIG. 7. The subterranean drilling system 900 includes a housing 902 enclosing a downhole drilling motor 904 (i.e., a motor, turbine, or any other device capable of rotating an output shaft) that is operably connected to an output shaft 906. A first thrust-bearing apparatus 600₁ (FIG. 7) is operably coupled to the downhole drilling motor 904. A second thrust-bearing apparatus 600₂ (FIG. 7) is operably coupled to the output shaft 906. A rotary drill bit 909 configured to engage a subterranean formation and drill a borehole is connected to the output shaft 906. The rotary drill bit 909 is shown as a roller cone bit including a plurality of roller cones 910. However, other embodiments may utilize different types of rotary drill bits, such as a so-called "fixed cutter" drill bit shown in FIGS. 5A and 5B. As the borehole is drilled, pipe sections may be connected to the subterranean drilling system 900 to form a drill string capable of progressively drilling the borehole to a greater depth within the earth.

A first one of the thrust-bearing assemblies 602 of the thrust-bearing apparatus 600₁ is configured as a stator that does not rotate and a second one of the thrust-bearing assemblies 602 of the thrust-bearing apparatus 600₁ is configured as a rotor that is attached to the output shaft 906 and rotates with the output shaft 906. The on-bottom thrust generated when the drill bit 908 engages the bottom of the borehole may be carried, at least in part, by the first thrust-bearing apparatus 700₁. A first one of the thrust-bearing assemblies 702 of the thrust-bearing apparatus 700₂ is configured as a stator that does not rotate and a second one of the thrust-bearing assemblies 702 of the thrust-bearing apparatus 700₂ is configured as a rotor that is attached to the output shaft 906 and rotates with the output shaft 906. Fluid flow through the power section of the downhole drilling motor 904 may cause what is commonly referred to as "off-bottom thrust," which may be carried, at least in part, by the second thrust-bearing apparatus 700₂.

In operation, drilling fluid may be circulated through the downhole drilling motor 904 to generate torque and effect rotation of the output shaft 906 and the rotary drill bit 908 attached thereto so that a borehole may be drilled. A portion of the drilling fluid may also be used to lubricate opposing bearing surfaces of the bearing elements 706 of the thrust-bearing assemblies 702.

FIG. 10 is a side cross-sectional view of an embodiment of a wire-drawing die 1000 that employs a PDC 1002 fabricated in accordance with the principles described herein. The PDC 1002 includes an inner, annular PCD region 1004 comprising any of the PCD tables described herein that is bonded to an outer cylindrical substrate 906 that may be made from the same materials as the substrate 104 shown in FIG. 1A. The PCD region 1004 also includes a die cavity 908 formed therethrough configured for receiving and shaping a wire being drawn. The wire-drawing die 1000 may be encased in a housing (e.g., a stainless steel housing), which is not shown, to allow for handling.

In use, a wire 1010 of a diameter $d_1$ is drawn through die cavity 1008 along a wire drawing axis 1012 to reduce the diameter of the wire 1010 to a reduced diameter $d_2$.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises") and mean "including, but not limited to."

The invention claimed is:

1. A method of fabricating a polycrystalline diamond compact, comprising:
   positioning an at least partially leached polycrystalline diamond table adjacent to a substrate to form an assembly, wherein the at least partially leached polycrystalline diamond table includes a proximal region adjacent to the substrate and a distal region spaced from the substrate; and
   subjecting the assembly to a high-pressure/high-temperature process to infiltrate the proximal region of the at least partially leached polycrystalline diamond table with an infiltrant from the substrate to no further than an intermediate location within the at least partially leached polycrystalline diamond table, while the distal region of the at least partially leached polycrystalline diamond table is not infiltrated with any infiltrant during the high-pressure/high-temperature process.

2. The method of claim 1 wherein subjecting the assembly to a high-pressure/high-temperature process to infiltrate the proximal region of the at least partially leached polycrystalline diamond table with an infiltrant from the substrate to no further than an intermediate location within the at least partially leached polycrystalline diamond table comprises selecting pressure and temperature conditions of the high-pressure/high-temperature process to be sufficiently low so that the infiltrant does not completely infiltrate the at least partially leached polycrystalline diamond table.

3. A method of fabricating a polycrystalline diamond compact, comprising:
   forming an at least partially leached polycrystalline diamond table including a first surface and an opposing second surface, the at least partially leached polycrystalline diamond table including bonded diamond grains defining interstitial regions, the at least partially leached polycrystalline diamond table including a first region extending from the first surface to an intermediate location therein having tungsten, tungsten carbide, or combinations thereof disposed in at least some of the interstitial regions thereof and a second region extending inwardly from the second surface that is substantially free of tungsten;

positioning the second region at least proximate to a substrate to form an assembly; and subjecting the assembly to a high-pressure/high-temperature process to form the polycrystalline diamond compact.

4. The method of claim 3 wherein forming an least partially leached polycrystalline diamond table comprises:

sintering diamond particles positioned adjacent to a cemented tungsten carbide substrate to form a polycrystalline diamond table bonded to the cemented tungsten carbide substrate, the polycrystalline diamond table including bonded diamond grains having metal-solvent catalyst disposed interstitially therebetween, the polycrystalline diamond table further including a portion adjacent to the cemented tungsten carbide substrate having the tungsten, the tungsten carbide, or the combinations thereof; and separating the polycrystalline diamond table from the cemented tungsten carbide substrate; and leaching at least a portion of the metal-solvent catalyst from the separated polycrystalline diamond table.

5. The method of claim 3 wherein the first region of the at least partially leached polycrystalline diamond table exhibits a thickness substantially less than that of the second region.

6. The method of claim 3 wherein:

the assembly comprises a silicon-cobalt containing layer between the at least partially leached polycrystalline diamond table and the substrate; and subjecting the assembly to a high-pressure/high-temperature process to form the polycrystalline diamond compact comprises infiltrating the at least partially leached polycrystalline diamond table with a liquid comprising silicon and cobalt so that at least a portion of the interstitial regions include at least one material formed therein selected from the group consisting of silicon carbide, cobalt carbide, and a mixed carbide of silicon and cobalt.

7. The method of claim 3 wherein subjecting the assembly to a high-pressure/high-temperature process to form the polycrystalline diamond compact comprises infiltrating the at least partially leached polycrystalline diamond table with an infiltrant from the substrate to no further than an intermediate location within the at least partially leached polycrystalline diamond table.

8. The method of claim 3 wherein the tungsten is in the form of substantially pure tungsten, an alloy including the tungsten, or combinations thereof.

9. The method of claim 1 wherein the intermediate location is at a depth, from an upper working surface of the at least partially leached polycrystalline diamond table, of at least about 50 µm.

10. The method of claim 1 wherein the intermediate location is at a depth, from an upper working surface of the at least partially leached polycrystalline diamond table, of about 50 µm to about 2000 µm.

11. The method of claim 1, further comprising not leaching the partially infiltrated polycrystalline diamond table.

12. The method of claim 1 wherein the substrate comprises a cemented carbide substrate including the infiltrant therein.

13. The method of claim 1 wherein the infiltrant comprises a metallic infiltrant.

14. The method of claim 4 wherein separating the polycrystalline diamond table from the cemented tungsten carbide substrate comprises grinding the cemented carbide substrate.

15. The method of claim 3 wherein:

the assembly comprises a metallic-infiltrant-containing layer disposed between the at least partially leached polycrystalline diamond table and the substrate; and subjecting the assembly to a high-pressure/high-temperature process to form the polycrystalline diamond compact comprises infiltrating the at least partially leached polycrystalline diamond table metallic infiltrant from the metallic-infiltrant-containing layer.

\* \* \* \* \*